(12) United States Patent
Jones et al.

(10) Patent No.: US 12,346,628 B2
(45) Date of Patent: Jul. 1, 2025

(54) VIEWPOINT SYNCHRONIZATION

(71) Applicant: Grypp Corp Limited, Northampton (GB)

(72) Inventors: Pete Jones, Northampton (GB); Adam Lancey, Northampton (GB); Jemal Patel, Northampton (GB)

(73) Assignee: Grypp Corp Limited, Northampton (GB)

( * ) Notice: Subject to any disclaimer, the term of this patent is extended or adjusted under 35 U.S.C. 154(b) by 0 days.

(21) Appl. No.: 18/865,432

(22) PCT Filed: Aug. 7, 2023

(86) PCT No.: PCT/GB2023/052086
§ 371 (c)(1),
(2) Date: Nov. 13, 2024

(87) PCT Pub. No.: WO2024/028617
PCT Pub. Date: Feb. 8, 2024

(65) Prior Publication Data
US 2025/0110684 A1 Apr. 3, 2025

(30) Foreign Application Priority Data
Aug. 5, 2022 (GB) ..................................... 2211475

(51) Int. Cl.
*G06F 3/14* (2006.01)
*H04L 12/18* (2006.01)
(52) U.S. Cl.
CPC ........ *G06F 3/1454* (2013.01); *H04L 12/1813* (2013.01)

(58) Field of Classification Search
CPC .......................... G06F 3/1454; H04L 12/1813
See application file for complete search history.

(56) References Cited

U.S. PATENT DOCUMENTS 10,498,973 B1 *  12/2019  Zavesky ................ H04N 5/262
2011/0307808 A1 * 12/2011  Giambalvo ............. G06F 9/451
                                                        715/760
(Continued)

OTHER PUBLICATIONS

Dec. 5, 2023 (WO) International Search Report and Written Opinion—App PCT/GB2023/052086.
(Continued)

*Primary Examiner* — Muhammad N Edun
(74) *Attorney, Agent, or Firm* — Banner & Witcoff, Ltd.

(57) ABSTRACT

A second digital content renderer receives a communication indicating properties of a first content viewing area of a first digital content renderer and first state data of an object rendered in the first area, the data including a configuration of the object. The second renderer renders a second content viewing area having a portion that contains an interactive representation of the first area, the interactive representation including an indication of the object, and is rendered based on the received properties of the first area and first state data. The second renderer receives a user interaction within the interactive representation that changes the configuration of the object and generates second state data based on the change. The second renderer sends a communication to the first renderer indicating the second state data that causes the first renderer to modify the object rendered in the first area to conform with the change.

20 Claims, 9 Drawing Sheets

(56) References Cited

U.S. PATENT DOCUMENTS

2021/0120053 A1* 4/2021 Shin .................... H04L 67/1068
2021/0318786 A1 10/2021 Barton
2022/0156030 A1 5/2022 Walmsley et al.

OTHER PUBLICATIONS

Jan. 30, 2023 (GB) Combined Search and Examination Report—App 2211475.5.

* cited by examiner

VIEWPOINT SYNCHRONIZATION

CROSS REFERENCE TO RELATED APPLICATIONS

This application is a national stage application under 35 U.S.C. § 371 of PCT/GB2023/052086, filed on Aug. 7, 2023, entitled "Content Synchronisation", which claims the benefit of British Patent Application No. 2211475.5 filed Aug. 5, 2022, each of which is incorporated herein by reference in its entirety.

FIELD OF THE INVENTION

The present disclosure relates to methods and systems for rendering content and in particular, for synchronising content between web browsers.

BACKGROUND OF THE INVENTION

Interactive multimedia calls allow face-to-face meetings to take place via video and audio devices. They also provide the ability to share screens and present documents, presentations, video and other digital works between participants as part of an interactive call. However, conventional screen sharing does not enable collaborative interaction between multiple parties. In particular, screen sharing only enables remote parties to view what is being seen on the screen of a particular user. In other words, screen sharing is static, rather than interactive.

These interactive calls may involve other interactions, such as remote administration. Remote administration allows a user to remotely control a host computer via another computer. The user must first install or enable software on the host computer and grant permission for the other computer to remotely control the host computer in order to do so. The user can then access the host computer via another computer by using the software. An interactive call may include remote administration. For example, an IT team member may help a user through an IT problem by remotely controlling the computer of the user. However, it is not possible for the user of the host computer and a user of the other computer to simultaneously control the host computer. Instead, control of the host computer is passed from one user to another as each user interacts with the host computer. In other words, simultaneous interaction is not possible via remote administration. Moreover, remote administration introduces serious security implications that renders presentation sessions or interactive conversations unfeasible.

Such remote administration is also not possible via a browser application, unless the parties are co-browsing. Co-browsing enables a user to access the browser of another person and navigate it in real-time. In co-browsing, websites are viewed through a proxy server, meaning that the server connects to the website and then shares the website with the connected parties. This is less secure than rendering the website straight from a source server.

Furthermore, in co-browsing, agents are only ever allowed to see what the customer sees. This means that they cannot access files or make changes on their own browser, which makes interactions between two parties more difficult and frustrating. Websites may also have poor user interfaces and/or may not have a mobile website version, which also makes interactions more difficult or frustrating.

Co-browsing also does not enable the tracking of customer-advisor interactions and/or filters to gain key metric insights that can be used to enhance future conversations.

In conventional screen-sharing and remote administration, full screen data is sent in real time between the two or more computers. For example, pixel data of each scanline on the host display may be sent during communications. This requires high bandwidth if many pixels change at the same time, such as when scrolling a window or otherwise moving objects on the screen. If high bandwidth is not available, this can cause problems in communication between users utilising screen-sharing or remote administration. This can be particularly problematic if such interactions are part of a sales pitch or communication between a supplier and a customer.

It is instead preferable to maintain a level of service and information provided to participants of the information, but this can be difficult to achieve with current architectures.

Therefore, there is required a method and system that overcomes these problems.

SUMMARY OF THE INVENTION

According to the present disclosure, there is provided a method for rendering a content.

The method comprises a step of receiving a first communication at a second digital content renderer or browser. The first communication indicates properties of a first content viewing area rendered in a first digital content renderer and first state data of an object rendered in the first content viewing area. The first state data comprises a configuration of the object, which may be a location (e.g. co-ordinates), size, shape, state (e.g. static, moving, clicked, unclicked etc.), movement (e.g. speed and/or direction) and/or property of the object. The property of the object may be metric data, for example, data describing how an object has changed, when it was changed, etc. The object (which may also be referred to as a component or element herein) may be a data object, a digital work, a digital object or data representing an image. The properties of the first content viewing area may be details, parameters or data describing a configuration of the content viewing area or data describing how the content viewing area should be rendered. For example, the properties may comprise a size and/or orientation of the first content viewing area. A content viewing area may be a portion of a screen (e.g. on a user device) on which content is rendered.

The method comprises a further step of rendering, by the second digital content renderer, a second content viewing area, wherein a portion of the second content viewing area contains an interactive representation of the first content viewing area. The interactive representation is rendered based on the received properties of the first content viewing area and the first state data, and includes an indication of the object. The indication of the object may be a shaped element corresponding to the shape of the object, but rendered without any further details. Instead, the object is rendered in the second content viewing area, outside of the portion of the content viewing area. That is, the content of the object is not duplicated in the interactive representation, as the object is already visible in the second content viewing area. This may reduce the bandwidth required to render the second content viewing area.

The interactive representation is a copy or remote rendering of the first content viewing area, but interaction can be carried out with the representation, the interaction being remote from the second digital content renderer. The remote interaction has an effect on the original (first) content viewing area. The method also comprises a step of receiving, via the second digital content renderer, a user interaction within the interactive representation that changes the configuration of the object. The change in configuration may change one aspect of the configuration or multiple aspects of the configuration.

There may be two types of interaction: an interaction within the interactive representation and an interaction with the object rendered outside the portion of the second content viewing area. An interaction within the interactive representation may comprise moving the indication of the object. An interaction with the object rendered outside the portion may comprise changing the object. For example, the change may include highlighting text, modifying text by addition or removal, or changing a state of the object.

Following the user interaction, second state data of the object is generated by the second digital content renderer, based on the change in the configuration. The second digital content renderer then sends a second communication to the first digital content renderer indicating the second state data. The second communication causes the first digital content renderer to modify the object rendered in the first content viewing area to conform with the change in configuration. That is, the second communication causes the first content viewing area to synchronise with the interactive representation.

The state data allows the determination or mapping of various objects in a content viewing area. Messages related to this mapping can be sent between two digital content renderers to update the content viewing area with any changes. That is, both digital content renderers have a current mapping of objects in the content viewing area and this mapping can be used to create an interactive representation of the content viewing area on a remote computer. The mapping can then be used to move or change the objects in the interactive representation and propagate the change to the original content viewing area.

Since each component of the original content viewing area is mapped, only updates to the state data are required when the configuration of the component changes. Thus, the method provides a more lightweight and efficient method of rendering and updating remote content. This enables two or more parties to interact with content on screen/content viewing area without requiring high bandwidth.

The object may be one or more of: text, streaming media, a video, a document, a graphical control element and a JSON object. The graphical control element may be a window, a scrollbar, a button, a selection box, a slider or an input box. The graphical control element may also be a combination of such elements. For example, it may be a combo box including a drop-down list and an editable textbox. The selection box may be a check box, a dropdown box, a radio button or a toggle switch. The object may be an object of another language other than JSON. For example, any other language used to store and/or transmit data may be used, such as YAML, XML, CSV, RDF, etc. The language may preferably be human-readable.

A first user (for example, a host) can therefore interact with an object in their interactive representation in a number of ways to affect the view of the second user. For example, the host might see that their video stream is covering the content of a document being discussed. The host can then move the video stream in the content viewing area of the second user by moving the video stream in the interactive representation.

A JSON object (or object of another data interchange format) may include metric data (properties). The metric data may indicate what the object is, how the object has changed (e.g. a change in configuration), when it was changed, key information about the user that caused the interaction, etc. That is, each state of the object is encoded in the metric data, making it possible to review or play back a past conversation/presentation via the metric data and without the need for screen recording. This avoids the need for large amounts of storage space necessary for storing video data, as only the metric data needs to be stored, which requires comparatively smaller storage space. Furthermore, it is possible to skip to the right place in the conversation/presentation more quickly, since the metric data inherently encodes the points of interest (e.g. when an object was changed). In contrast, a screen recording may include long periods where nothing of interest occurs on screen.

Preferably, the method comprises further steps of receiving, subsequent to the first communication, a third communication at the second digital content renderer. The third communication may indicate second properties of the first content viewing area. The second properties may indicate a change in the size and/or orientation of the first content viewing area. The second digital content renderer may then render a further interactive representation of the first content viewing area, based on the received second properties. The rendering of the further interactive representation may comprise modifying the original interactive representation to conform with the second properties. For example, if the second user rotates the orientation of their computing device or changes their computing device (e.g. by switching from a smartphone to a tablet device), the interactive representation of the first user updates accordingly. The third communication may further include updated state information that provides a new/updated mapping of the object as a result of the change in size and/or orientation.

Preferably, the communications are secure communications. WebRTC is an example of a secure communication. For example, the first digital content renderer and the second digital content renderer may be WebRTC compliant browsers or applications and the communications may be sent via a WebRTC channel established between the first and second renderers. This allows users to interact without the need to download an application or install a plugin.

The first content viewing area may be a first viewport and the second content viewing area is a second viewport. A viewport is an area in which content of interest is rendered. For web browsers, it is the visible portion of content (e.g. a document) and does not include the UI elements of the web browser. The viewport of the web browser can be shifted by scrolling the web page.

Preferably, the second state data comprises data indicating a difference between the initial configuration and the changed configuration. A message including such data may be referred to as a delta message or delta encoding. Sending only the change in configuration means that the method of rendering content may be even more efficient, as a large number of changes can be sent without requiring high bandwidth. Alternatively, the second state data may be an update of the first state data.

Preferably, prior to the step of receiving the first communication and in response to a user following a URL, the first content viewing area is rendered by the second content renderer.

Optionally, the second digital content renderer may receive a fourth communication from the first digital content renderer indicating that the object rendered in the first content viewing area has been modified to conform with the change in configuration. That is, the second digital content renderer may receive confirmation that the first content viewing area has been synchronised with the interactive representation.

The method may further comprise receiving, via the first digital content renderer, a user interaction within the first content viewing area that changes the configuration of the object. The first digital content renderer may then generate third state data of the object, based on the change in the configuration, and send the third state data in a fifth communication to the second digital content renderer. The second digital content renderer may then modify the object rendered in the interactive representation to conform with the change in configuration, based on the received third state data.

In other words, the method may be two-way: changes occurring in the interactive representation may be sent to the first digital content renderer to update the first content viewing area and changes occurring in the first content viewing area may be sent to the second digital content renderer to update the interactive representation. Thus, the first content viewing area and the interactive representation can be kept up to date in real-time. This further improves the synchronisation and updating of content between the digital content renderers.

The method may further comprise a step of determining that the fifth communication was received within a predetermined time period of receiving the user interaction within the interactive representation. For example, the fifth communication may be received at the same time as, or shortly before or after, receiving the user interaction. The second digital content renderer may then prevent modification of the object rendered in the interactive representation to conform with the change in the configuration indicated in the third state data. In other words, the second digital content renderer may not accept the change already effected on the first digital content renderer. This may be based on rules that prioritise changes on the second digital content renderer. The second state data generated by the second digital content renderer in response to the user interaction may then include state data that causes the first renderer to undo the change effected on the first renderer, as well as causing the first renderer to conform with the change in configuration in the interactive representation. In another example, the rules-based configuration may prioritise changes on the first digital content renderer. In this case, the second digital content renderer then modifies the object rendered in the interactive representation to conform with the change in configuration, based on the received third state data, even though a user interaction has been received at the second digital content renderer.

Furthermore, the step of preventing modification of the object may only occur when there is a conflict between the change in configuration of the object rendered in the interactive representation and the change in configuration of the object rendered the first content viewing area. A conflict may be that the first user and the second user attempt to change the same type of configuration of the object. For example, there may be a conflict if both users attempt to change the size or location of the object. However, it may be determined that there is not a conflict if both users attempt to change the same type of configuration in a similar manner. For example, if one user moves the object a first distance to the left (e.g. 10 cm) and another user moves the object a greater distance to the left (e.g. 20 cm), the second digital content renderer may generate second state data that takes account of the change that has already taken place in the first content viewing area. For example, the second state data may indicate to move the object a distance to the left equal to the difference in the first distance and the greater distance (e.g. 10 cm). This may be done instead of causing the first digital content renderer to undo the change of the one user (i.e. move the object the first distance to the right) and then implement the change of the other user (i.e. move the object the greater distance to the left).

The method may further comprise sending properties of the second content viewing area, the properties of the first content viewing area and the second state data to a database.

In accordance with a second aspect, there is provided a method of rendering content. The method comprises a step of rendering a first content viewing area and an object within the first content viewing area on a first digital content renderer. The first content viewing area may be a first viewport.

The first digital content renderer then sends a first communication indicating properties of the first content viewing area and first state data of the object rendered in the first content viewing area. The first state data indicates a configuration of the object, which may be a location (e.g. co-ordinates), size, shape, state (e.g. static, moving, clicked, unclicked etc.), movement (e.g. speed and/or direction) and/or property of the object. The object (which may also be referred to as an element or a component herein) may be a data object, a digital work, a digital object or data representing an image. The properties of the first content viewing area may be details, parameters or data describing the configuration of the content viewing area or data describing how the content viewing area should be rendered. For example, the properties may comprise a size and/or orientation of the first content viewing area.

The method also comprises receiving a second communication from a second digital content renderer indicating second state data. The second state data indicates a change in configuration of the object received via a user interaction within the second digital content renderer. The first digital content renderer then modifies the object rendered in the first content viewing area to conform with the change in configuration, based on the received second state data.

The object may be one or more of: text, streaming media, a video, a document a graphical control element and a JSON object. The graphical control element may be a window, a scrollbar, a button, a selection box, a slider or an input box. The graphical control element may also be a combination of such elements. For example, it may be a combo box including a drop-down list and an editable textbox. The selection box may be a check box, a dropdown box, a radio button or a toggle switch.

An object of a data exchange language (e.g. a JSON object) may include metric data (properties). The metric data may indicate how the object has changed (e.g. a change in configuration), when it was changed, etc. That is, each state of the object is encoded in the metric data, making it possible to review or play back a past conversation/presentation via the metric data and without the need for screen recording. This avoids the need for large amounts of storage space necessary for storing video data, as only the metric data needs to be stored, which requires comparatively smaller storage space. Furthermore, it is possible to skip to the right place in the presentation more quickly, since the metric data inherently encodes the points of interest (e.g. when an object was changed). In contrast, a screen recording may include long periods where nothing of interest occurs on screen (which also unnecessarily increases the storage space required to store the screen recording).

Preferably, the method comprises further a step of sending a third communication indicating second properties of the first content viewing area, subsequent to the sending of the first communication. The second properties may indicate a change in the size and/or orientation of the first content viewing area. Therefore, if the second user rotates the orientation of their computing device or changes their computing device (e.g. by switching from a smartphone to a tablet device), the updated details are sent to the second digital content renderer so that the first content viewing area and the interactive representation remain synchronised.

Preferably, the communications are secure communications. For example, the second digital content renderer and the first digital content renderer may be WebRTC compliant browsers or applications and the communications may be sent via a WebRTC channel established between the first and second renderers.

Preferably, the second state data comprises data indicating a difference between the initial configuration and the changed configuration. A message including such data may be referred to as a delta message or delta encoding. Sending only the change in configuration means that the method of rendering content may be even more efficient, as a large number of changes can be sent without requiring high bandwidth. Alternatively, the second state data may be an update of the first state data.

Preferably, prior to the step of sending the first communication and in response to a user following a URL, the first content viewing area is rendered by the second content renderer.

Optionally, the first digital content renderer may send a fourth communication indicating that the object rendered in the first content viewing area has been modified to conform with the change in configuration.

The method may further comprise receiving, via the first digital content renderer, a user interaction within the first content viewing area that changes the configuration of the object. The first digital content renderer may then generate third state data of the object, based on the change in the configuration, and send the third state data in a fifth communication to the second digital content renderer. The second digital content renderer may then modify the object rendered in the interactive representation to conform with the change in configuration, based on the received third state data.

The method may further comprise receiving, via the first digital content renderer, a further communication indicating further state data. The first digital content renderer may then modify the object rendered in the first content viewing area to conform with the change in configuration, based on the received further state data.

In other words, the method may be two-way: changes occurring in the interactive representation may be sent to the first digital content renderer to update the first content viewing area and changes occurring in the first content viewing area may be sent to the second digital content renderer to update the interactive representation. Thus, the first content viewing area and the interactive representation can be kept up to date in real-time. This further improves the synchronisation and updating of content between the digital content renderers. The method may further comprise receiving a user interaction within the first content viewing area. The first digital content renderer may then determine that the further communication was sent within a predetermined time period of receiving the user interaction within the first content viewing area. For example, the further communication may be sent at the same time as, or shortly before or after, receiving the user interaction. The first digital content renderer may then prevent modification of the object rendered in the first content viewing area to conform with the change in the configuration indicated by the third state data. In other words, the first digital content renderer may not accept the change already effected on the second digital content renderer. This may be based on rules that prioritise changes on the first digital content renderer. The first digital content renderer may then generate and send additional state data that causes the second renderer to undo the change effected on the second renderer, as well as causing the second renderer to conform with the change in configuration in the first content viewing area. In another example, the rules-based configuration may priorities changes on the second digital content renderer. In this case, the first digital content renderer then modifies the object rendered in the first content viewing area to conform with the change in configuration, based on the received further state data, even though a user interaction has been received at the first digital content renderer.

Furthermore, the step of preventing modification of the object may only occur when there is a conflict between the change in configuration of the object rendered in the interactive representation and the change in configuration of the object rendered the first content viewing area. A conflict may be that the first user and the second user attempt to change the same type of configuration of the object. For example, there may be a conflict if both users attempt to change the size or location of the object. However, it may be determined that there is not a conflict if both users attempt to change the same type of configuration in a similar manner. For example, if one user decreases the size of the object by a first amount (e.g. by 100 pixels in height) and another user decreases the size of the object by a greater amount (e.g. by 150 pixels in height), the second digital content renderer may generate second state data that takes account of the change that has already taken place in the first content viewing area. For example, the second state data may indicate to further decrease the size of the object an amount equal to the difference in the first decrease and the greater decrease (e.g. by 50 pixels in height). This may be done instead of causing the first digital content renderer to undo the change of the one user (e.g. increase the size of the object by the first amount) and then implement the change of the other user (e.g. decrease the size of the object by the greater amount). In the case where the change in size is represented as a percentage of the original object size, the method may include a step of calculating a percentage amount to change the object size following the change of one user to arrive at the change of another user.

The method may further comprise sending, by the second digital content renderer, properties of the second content viewing area, the properties of the first content viewing area and the second state data to a database. The first digital content renderer may also send properties of the first content viewing area and the first state data to the database.

In accordance with a third aspect, there is a system for rendering digital content. The system comprises:
    a first computing device comprising one or more processors and memory storing computer-readable instructions which, when executed by the processor, cause the first computing device to perform steps of:
        receiving, at the second digital content renderer, a first communication indicating properties of a first content viewing area and first state data of an object rendered in a first content viewing area, the first state data including a configuration of the object;

rendering, by the second digital content renderer, a second content viewing area, wherein a portion of the second content viewing area contains an interactive representation of the first content viewing area that is rendered based on the received details of the first content viewing area and the first state data;

receiving, via the second digital content renderer, a user interaction within the interactive representation that changes the configuration of the object;

generating, by the second digital content renderer, second state data of the object based on the change in the configuration; and sending, by the second digital content renderer, a second communication indicating the second state data; and a second computing device comprising one or more processors and memory storing computer-readable instructions which, when executed by the processor, cause the second computing device to perform steps of:

rendering, by a first digital content renderer, a first content viewing area and an object within the first content viewing area;

sending, by the first digital content renderer, a first communication indicating details of the first content viewing area and first state data of the object rendered in the first content viewing area, the first state data including a configuration of the object;

receiving, at the first digital content renderer, the second communication;

modifying, by the first digital content renderer, the object rendered in the first content viewing area to conform with the change in configuration, based on the received second state data.

The system may also be configured to operate in accordance with the above methods. The system may further include a database for storing properties of the second content viewing area, the properties of the first content viewing area, and the second state data to a database received from the second digital content renderer; and storing properties of the first content viewing area and the first state data received from the first digital content renderer. Alternatively, the system may include two databases: one for storing properties and state data received from the second digital content renderer; and one for storing properties and state data received from the first digital content renderer.

It should be noted that any feature described above may be used with any particular aspect or embodiment of the invention. Moreover, the combination of any specific apparatus, structural or method features is also provided, even if that combination is not explicitly disclosed.

BRIEF DESCRIPTION OF THE DRAWINGS

The present invention may be put into practice in a number of ways and embodiments will now be described by way of example only and with reference to the accompanying drawings, in which.

DETAILED DESCRIPTION OF PREFERRED EMBODIMENTS

Figure 1:
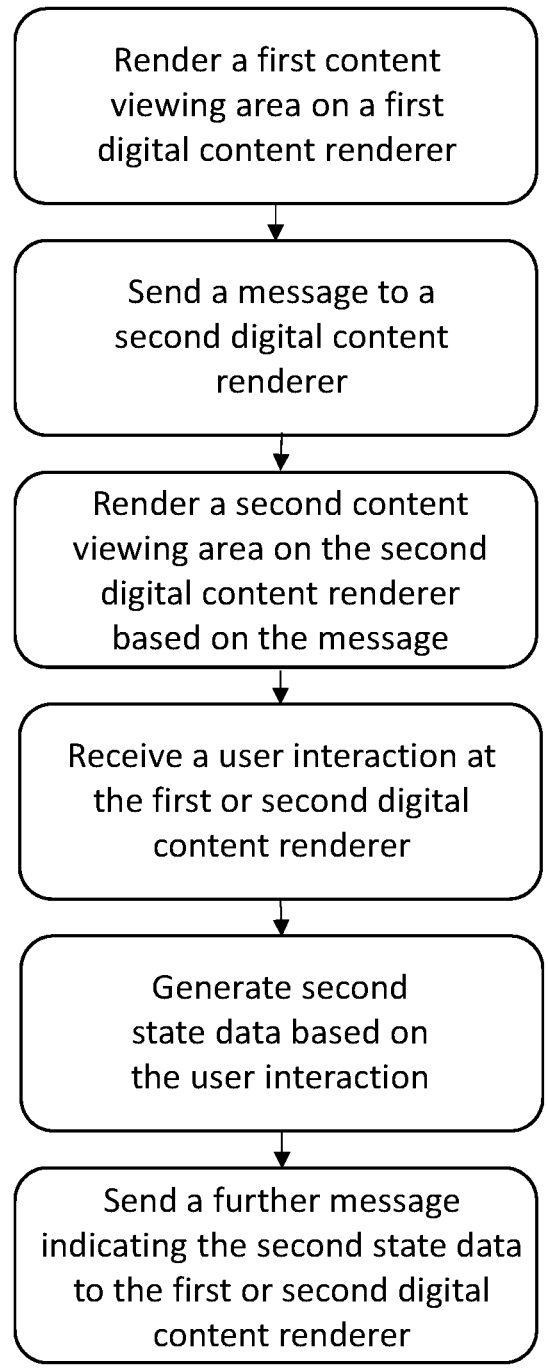
FIG. 1 illustrates a flowchart of a method for rendering content on a digital content renderer.

The present disclosure relates to a method of rendering content between two or more digital content renderers. A digital content renderer may be a browser or an application capable of rendering digital content or assets. Examples of digital content/asset types include documents, forms, diagrams, images, videos, calculators, spreadsheets, presentations and maps. Videos may include pre-recorded videos and real-time video streams.

During a presentation session or multimedia call, two or more parties (e.g. a host and one or more guests) may share a common view. For example, there may be a global user interface that all parties can interact with via their respective computing devices. In another example, one party may be screen-sharing, such that each party can see a full or partial view of the content on the computing device of that party. In yet a further example, the view of one party may be replicated on each computing device.

During such a call, digital content may be manipulated by a user of a computing device (e.g. a guest). Manipulation may include configuring and/or arranging assets or data objects in the view of the user. For example, a user may move an object such that the location of the object is changed. Similarly, a user may change a size of the object, a shape of the object, a movement of the object and/or a state of the object. As the user manipulates the asset, state data of the asset may be sent between the computing devices via messages. This state data may allow the determination or mapping of locations (or other information) of various objects in each digital content renderer. The digital content renderers can then use the mapping to move or change the objects in a view of another digital content render.

In one example implementation, the system uses a real-time communication framework, such as WebRTC®, which enables video, audio and data communication to take place via a web browser without a download or plugin required. WebRTC provides internet browsers with standardised Real-Time Communications (RTC) capabilities via simple JavaScript Application Programming Interfaces (APIs). It enables rich, high quality RTC applications to be developed in the browser via JavaScript APIs and HTML5 code, for example. Communication may be bi- or multi-directional and may include audio telephone and video communication between parties (e.g. a host and a guest or viewer). However, the present disclosure is not limited to WebRTC and other communication frameworks may be implemented using the disclosed methods and systems.

The system provides synchronised content between participants in an interactive session (e.g. conference call) without the need to download and install additional software or plug-ins. For browsers that do not support WebRTC then a downloadable application (e.g. a mobile app) may be used.

This application, app or apps may work across some or all major platforms (e.g. Windows, OSX, IOS, etc.). Browser to browser communication allows the system to encompass dual (or multiple) streaming technology. The system may accommodate multiple presenters, simultaneous presentations and separate stores of content.

In one example, the application (mobile or desktop) used instead of a webRTC compliant browser may be a wrapper for a Chromium-based browser, which does support the use of WebRTC. This allows guest user to participate in a presentation session. Therefore, a user may use the system even if they do not have a browser installed on their machine that supports WebRTC.

This method has applications in a wide range of industry and usage types wherever real-time synchronous visual sharing of and interaction with documentation assets and data are required. The method enhances remote conversations between two or more parties, leading to a better experience and outcome. Examples of such communication sessions include telephone calls, chat/messaging conversation and may be in the field of retail, sales, or customer service but with wider business and social applications. For example, companies without contact centres may use the platform to enhance a variety of business conversations.

FIG. 1 shows a flowchart of a method for rendering digital content. At step 101, a first digital content renderer renders a first content viewing area. The first digital content renderer may correspond to a guest user. The content viewing area may be a viewport on a computing device. In web browsers, the viewport is the visible portion of the web browser, excluding user interface elements (such as address bars, tool bars, etc.). The viewport can be moved by scrolling if the document (e.g. web page) is larger than the viewport.

The first content viewing area may include one or more rendered objects. The one or more objects may include one or more of: text, streaming media, a video, a document, a graphical control element and a JSON object (or an object of another language for transmitting and/or storing data). This will be discussed in more detail in relation to FIGS. 3 to 8.

In step 102, the first digital content renderer sends a message to a second digital content renderer. The second digital content renderer may correspond to a host user.

The message indicates properties of the first content viewing area and first state data of the one or more objects rendered in the first content viewing area. The first state data may comprise a configuration of the object. The configuration may be a location, size, shape, state, identifier (ID) and/or movement of the object. It will be appreciated that other configuration details may be used instead of, or in addition to, these examples.

The location of the object may be indicated by one or more co-ordinates. The one or more co-ordinates may be relative to the first content viewing area or to the display of the computing device. In the case where one co-ordinate indicates the location of the object, the one co-ordinate may correspond to a pre-determined vertex of the object. For example, it may be pre-determined that the co-ordinate represents the lowermost and leftmost vertex of the object. In other examples, the co-ordinates of each vertex may be used to indicate the location of the object. The identifier of the object may be a string that identifies the object. The identifier of each object is preferably unique, such that objects of the same type (e.g. two video streams) have a different identifier.

The state data may be sent in JavaScript Object Notation (JSON) format. An example JSON format message that may be sent in step 102 is shown below.

```
{
  "connectionId" : "xxxxx",
  "container": "customer-stream-box",
  "positions" :{ "x" : 123, "y":123},
  "setState" : false
}
```

This example message includes details of the connection, such as a connection identifier, an identifier of the object (here, "customer-stream-box") and a position (location) of the object. Each connection ID is associated with a user and so is unique to a user. Parties sharing a conversation will share the same conversation ID. The conversation ID may also be included in the message. Details in the message (such as connection ID) may change over time. Details may also change depending on permissions of the digital content renderer.

The positions may be defined based on the container element, the division between sections of content (div) and/or the scale of the element. The positions may be defined in pixels. Alternatively, the positions may be percentage based then converted to pixel measurements based on the scale of a viewport's div scale.

The setState is used as each user interaction is read by the one or more connections (e.g. computing devices/digital content renderers). If the value is set to false, then the other connections (e.g. the first digital content renderer) will ignore the message. Otherwise, if it is true, then the connections will take actions to update their user interface accordingly.

It will be appreciated that other and/or additional fields may be present in the message. For example, a size property (e.g. {width: 100, height: 100}) may also be included. It will also be understood that, although this example message is in JSON format, any appropriate data interchange format could be used instead. For example, YAML, XML or CSV messages may be used.

At step 103, the second digital content renderer renders a second content viewing area. A portion of the second content viewing area is rendered using the received properties of the first digital content viewing area and the first state data describing the one or more objects. That is, the second content viewing area may include an interactive representation of the first digital content viewing area that includes an indication of the object. The portion of the second content viewing area may be less than or equal to 50% of the size of the second content viewing area.

A remainder of the second content viewing area may include content that is rendered only on the second digital content renderer. That is, only a user of the second digital content renderer may be able to interact with this area. The remainder displays the object outside of the portion of the second content viewing area and may also display content of a browser of the second user and/or content in another application.

A user interaction that changes the configuration of the object may be received at step 104. The user interaction may be received at either or both of the first and first digital content renderers.

The user interaction may comprise a user interacting with an object via a user input device. The user input device may be one or more of: a pointing device, such as a mouse, a trackball, joystick or touchpad; a keyboard; a sensor, such as an eye-tracking sensor or a movement-tracking sensor; and a stylus. For example, the user may click on the object using the input device to change a configuration of the object.

Alternatively, the user interaction may comprise a user using their finger to interact with an object.

Following the user interaction, the digital content renderer that received the user interaction generates second state data of the object based on the change in the configuration in step 105. The second state data may comprise data indicating a difference between the initial configuration and the changed configuration. A message including such data may be referred to as a delta message or delta encoding. Sending only the change in configuration means that the method of rendering content may be even more efficient, as a large number of changes can be sent without requiring high bandwidth. Alternatively, the second state data may be an update of the first state data.

In step 106, the digital content renderer sends a second communication to the other digital content renderer. The message causes the other renderer to modify the object rendered in the other renderer to conform with the change in configuration. An example message is shown below.

```
{
  "connectionId" : "xxxxx",
  "container": "customer-stream-box",
  "positions" : { "x" : 234, "y": 234},
  "setState" : true,
}
```

Although this example message is in JSON format, it will be appreciated that any appropriate data interchange format could be used instead. For example, YAML, XML or CSV messages may be used.

It will be understood that, although FIG. 1 is discussed with reference to two digital content renderers, the method could include more than two digital content renderers. For example, one or more first digital content renderers may each render a respective first content viewing area in step 101. Each digital content renderer may then send a communication to one or more second digital content renderers as described in step 102. Each of the one or more second digital content renderers may then render respective content viewing areas using the data in the messages. That is, each of the one or more second digital content renderers may display one or more interactive representations of the respective content viewing areas.

One or more user interactions may then be received in the one or more interactive representations that changes the configuration of one or more objects. For example, two second digital content renderers may receive a user interaction. Following the user interaction, second state data may be generated based on the change in configuration for each user interaction. The second state data may then be sent to the other digital content renderers.

It will be appreciated that, although FIG. 1 has been discussed with reference to a second digital content renderer including an interactive representation of the content viewing area of a second renderer, the second renderer may instead or also include an interactive representation of the second digital content renderer. That is, the first digital content renderer may also perform steps 101 to 106 described as being performed by the second digital content renderer and vice versa. Alternatively, the second renderer may perform steps 101 to 106 described as being performed by the second digital content renderer instead of the second digital content renderer performing these steps. The second digital content renderer may then perform steps 101 to 106 described as being performed by the first digital content renderer.

Figure 2:
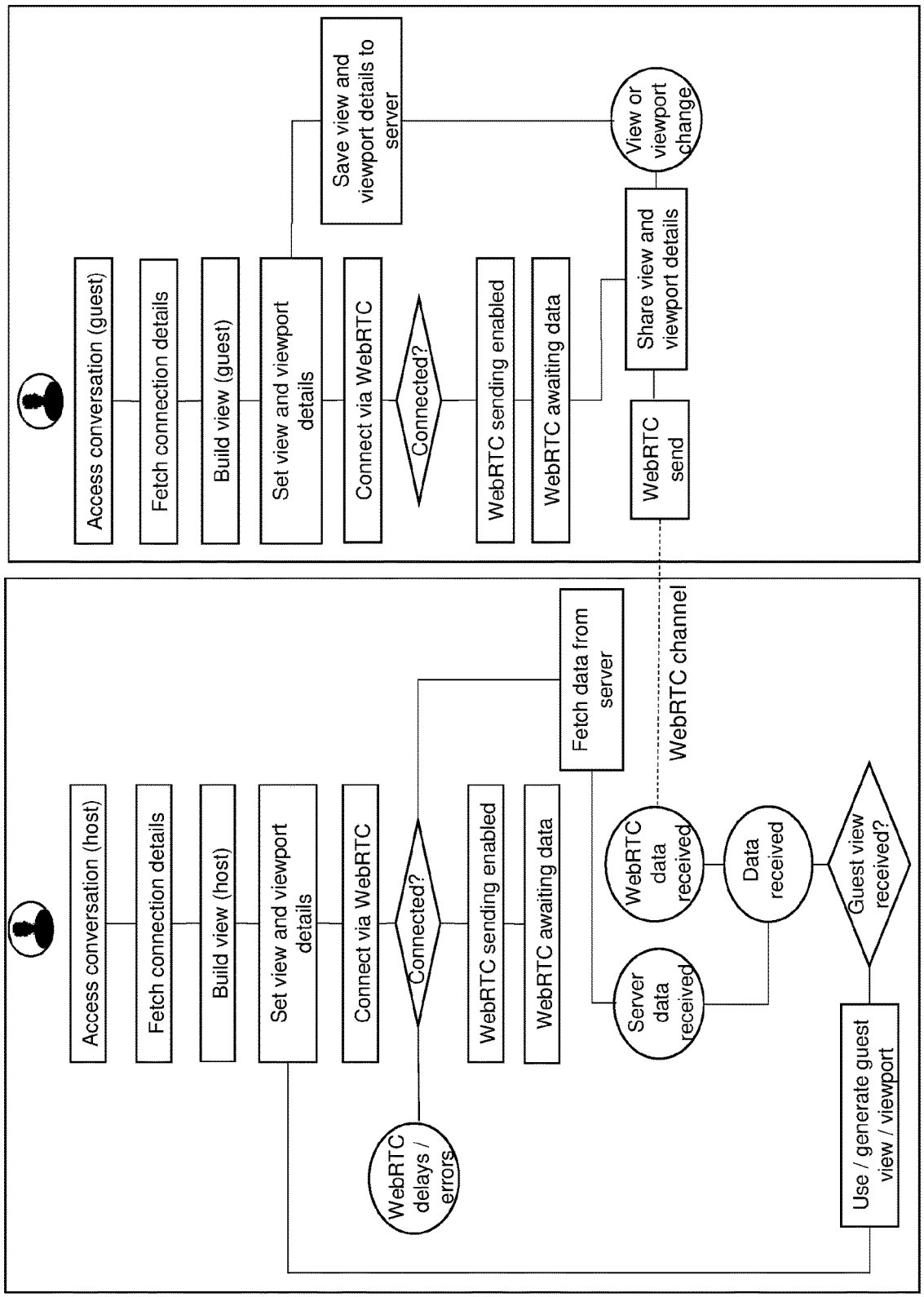
FIG. 2 shows a flowchart of a method for rendering content on a digital content renderer.

FIG. 2 illustrates a specific embodiment of the method discussed in relation to FIG. 1.

A first user (host) may invite a second user (guest) to join an interactive session. This can be done by the host sending a URL to the second user, for example via e-mail or text. The guest can follow the link to launch an application (e.g a browser window) that will present the interactive session. The host may also follow the URL to launch or join the interactive session.

The host instance and the guest instance of the application then fetch details of the connection. Details of the connection may include the type and/or model of the computing device, operating system of the device, user ID (connection ID), username of the user, conversation code (conversation ID) and/or viewport size. Other connection details may be used as well as, or instead of, these details. Each instance then builds a view of the interactive session via a handshaking protocol. Building the view may comprise defining which elements (objects) should be rendered and where these elements will appear in a content viewing area. This step may also comprise fetching content, including the objects, from a server.

Following the building, the view is set, which may comprise rendering one or more objects on each instance of the application (i.e., setting the current view on all connections, based on the actions that have been sent to the connections). The one or more objects may be placeholder elements that indicate where other objects will be rendered once data describing the objects has been obtained from a server. The view may be set by the host. For example, the host may determine before the start of the interactive session which objects should be rendered.

Details of a content viewing area of each application instance are determined, which may include determining a size and/or orientation of the content viewing area. The content viewing area may be a viewport. The host may generate the guest view and/or viewport based on the view set by the host and/or the viewport details of the host.

Once the guest view has been set and the content viewing area details determined, the guest instance of the application my send details of the view and the content viewing area to a server. The details of the view may include configurations of elements rendered in the viewport. The configurations may comprise one or more of: a position, a size (e.g. an area, a height and width and/or a diameter), a shape, a state and a movement of the one or more objects. The content viewing area details may comprise one or more of: a size (e.g. an area and/or a height and width) and an orientation (e.g. portrait or landscape).

The applications then attempt to establish a connection. The connection may be made via a secure communication channel, such as WebRTC. If one or more of the applications is slow to or unable to connect, an error message may be presented to the users.

Once the connection has been established, it is possible to send and receive data via the secure connection. The host digital content renderer may then retrieve data from a server. This data may include data enabling one or more objects to be rendered on the content viewing areas, e.g. to replace the placeholder elements. The host renderer may send a message to the server to confirm that the data has been received.

Figure 3:
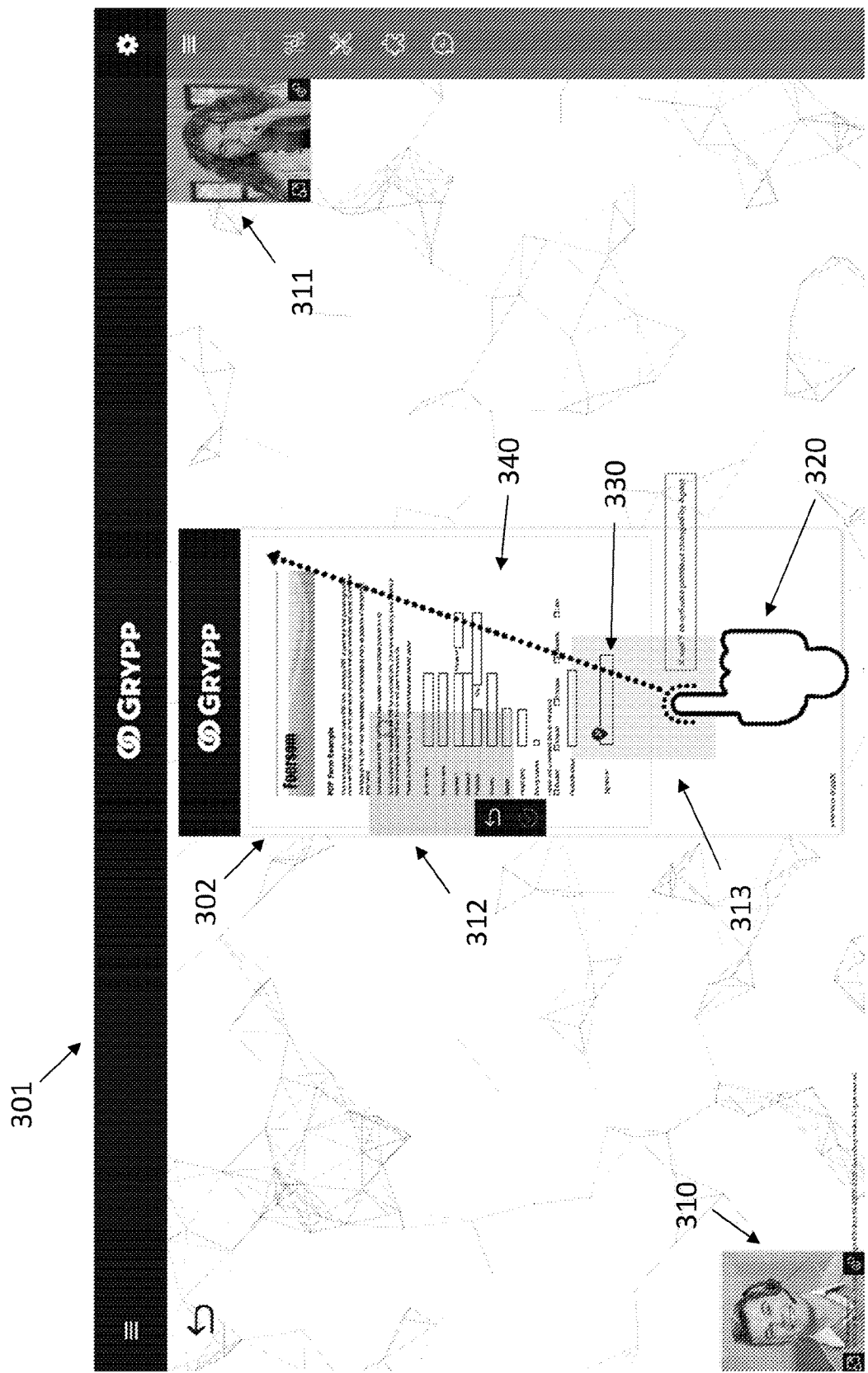
FIG. 3 shows an example screenshot of a content viewing area on a digital content renderer.
Figure 5:
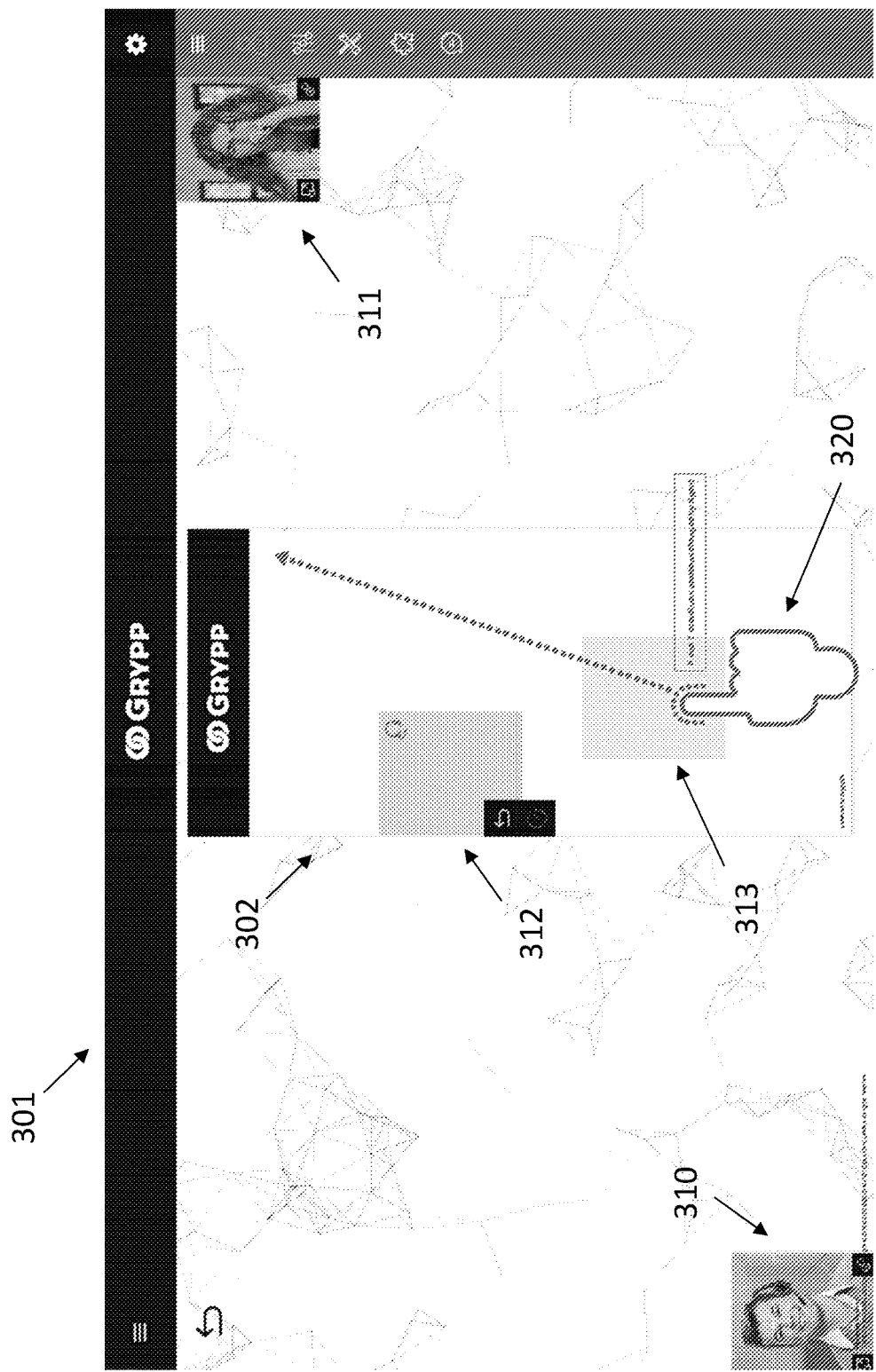
FIG. 5 shows an example screenshot of a content viewing area on a digital content renderer.
Figure 7:
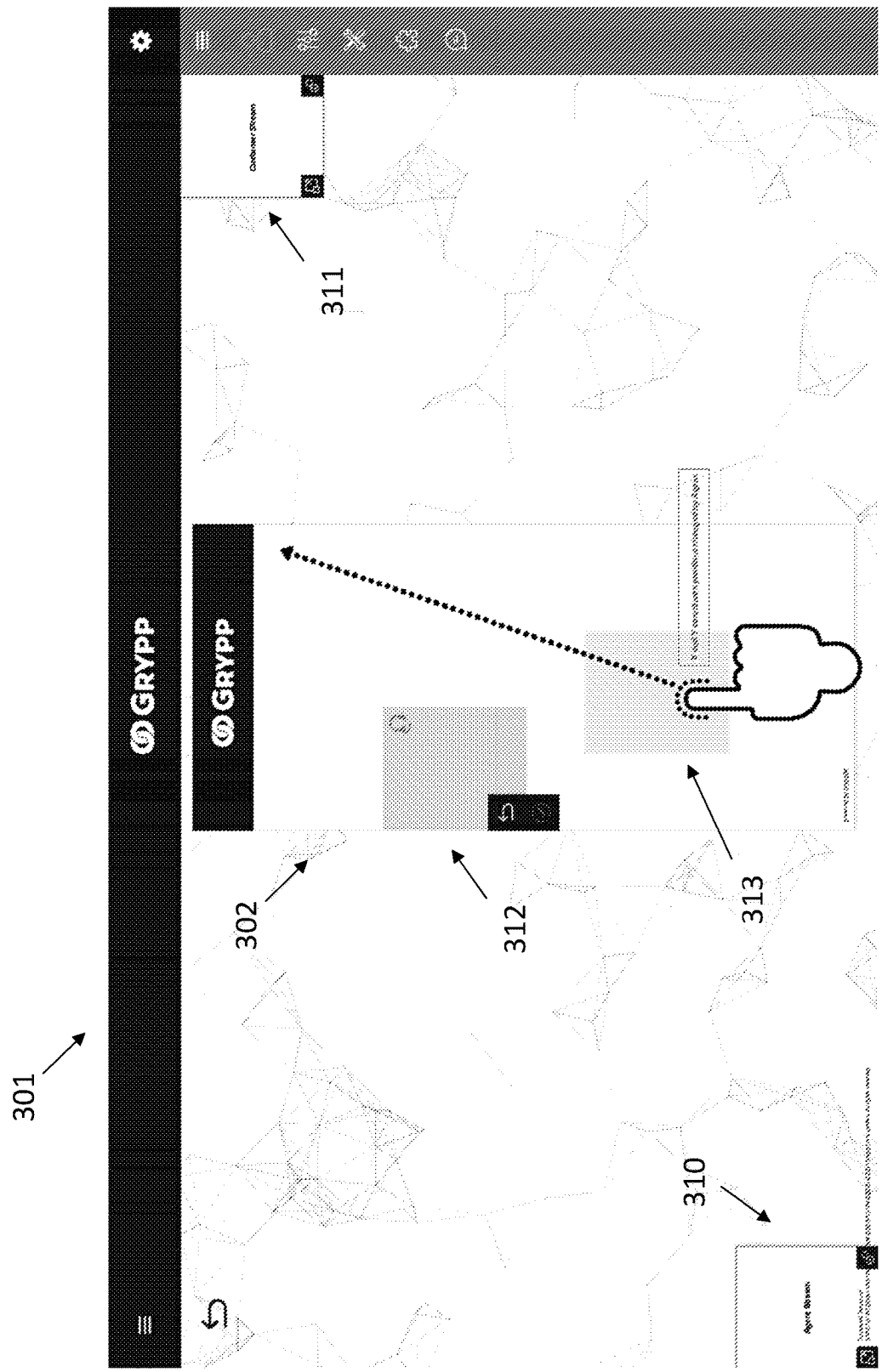
FIG. 7 illustrates an example screenshot of a content viewing area on a digital content renderer.

A secure (e.g. WebRTC) channel may then be established between the host renderer and the guest renderer. When a user interacts with the guest content renderer, this may change properties of the first content viewing area and/or state data of one or ore objects rendered in the first content viewing area. For example, a user using a mobile computing device to access the interactive session may rotate their device, such that the orientation of the content viewing area changes, e.g. from portrait to landscape view. Updated properties of the guest content viewing area may then be sent in a message via the secure channel to the host renderer. The message may cause the interactive representation rendered on the host renderer to conform with the change in configuration, such that the interactive representation corresponds to the guest content viewing area. FIGS. 3, 5 and 7 illustrate specific embodiments of the present disclosure.

FIGS. 3, 5 and 7 show a content viewing area of a host 301, which includes an interactive representation 302 of the guest content viewing area 303. A portion of the host content viewing area 301 distinct from the interactive representation 302 may include a video stream 310, 311 of the host and the guest.

The interactive representation 302 includes indications of these video streams 312, 313 rendered in the guest content viewing area 303. The indications 312, 313 may be a shaped element corresponding to the shape of the video streams, such as the shaded boxes illustrated in FIGS. 3 and 5. That is, the content of the video streams 310, 311 may not be duplicated in the interactive representation 302, as the video streams 310, 311 are already visible in the host content viewing area 301. This may reduce the bandwidth required to render the host content viewing area 301 that includes the interactive representation 302. In other embodiments, the video streams 310, 311 may also be shown in the interactive representation 302.

The interactive representation 302 shown in FIG. 3 includes an example of content that may be included in the guest content viewing area, specifically a Portable Document Format (PDF) document 340. However, it will be appreciated that other content may be included as well as, or instead of, a PDF document 340. For example, other document formats, such as a Hypertext Markup Language (HTML) document, or a word processing document may be rendered. Additionally or alternatively, other objects, such as a JSON object, text, streaming media, a video, audio file, an interactive 2D or 3D rendering/graphic (e.g. using WebGL), an image of any format (such as a JPEG, PNG, GIF image) or a graphical control element may be rendered. In FIG. 5, only the indications of the video streams 312, 313 are shown in the interactive representation 302 for simplicity. However, other indications of content as described above may be rendered in addition to, or instead of, the elements 312, 313. For example, the interactive session may not include either video or audio, as video and/or audio may be provided via other means, such as a telecommunications device.

The host may interact with an object in the interactive representation 302. For example, as shown in FIGS. 3, 5 and 7, the user may interact with the indication of a video stream 313 to move its position. This is possible because, as described with reference to FIG. 1, the first digital content renderer 920 sends properties of the content viewing area 303 and first state data of one more objects rendered therein. The first state data may include information about the position of the one or more objects (e.g. x-y co-ordinates) such that a mapping of the objects can be generated by the second digital content renderer 910, which may be included in a JSON file. When the user interacts with the interactive representation 302, the x-y co-ordinates are updated in the JSON file of the host and the updated co-ordinates (or data indicating a change in the co-ordinates) are sent to the first digital content renderer 920. The first digital content renderer 920 can then update its JSON file to correspond with that of the second digital content renderer 910. The first content viewing area 303 can thus be updated in real-time to correspond to the view in the interactive representation 302.

The host may move an object to uncover content that is hidden in the interactive representation 302 (and, accordingly, in the guest content viewing area 303). For instance, the signature box 330 in FIG. 3 is obscured by one of the video streams 313. By moving the object in the interactive representation 302, the signature box 330 may be revealed in both the interactive representation 302 and the guest content viewing area 303. The interaction 320 may be via a user input device, such as a mouse, or via the user using their finger to move the object 313.

Figure 4:
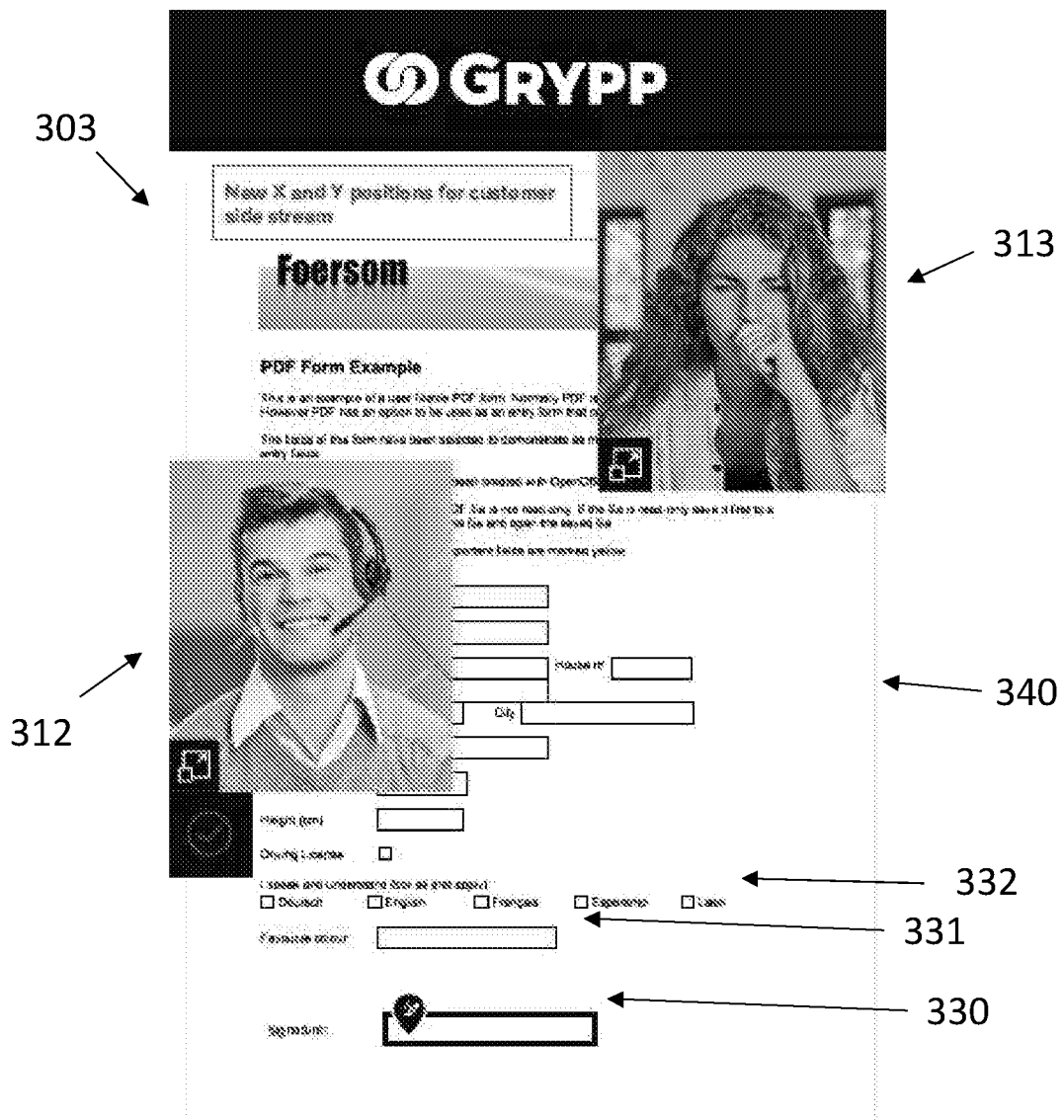
FIG. 4 illustrates an example screenshot of a content viewing area on a digital content renderer.
Figure 8:
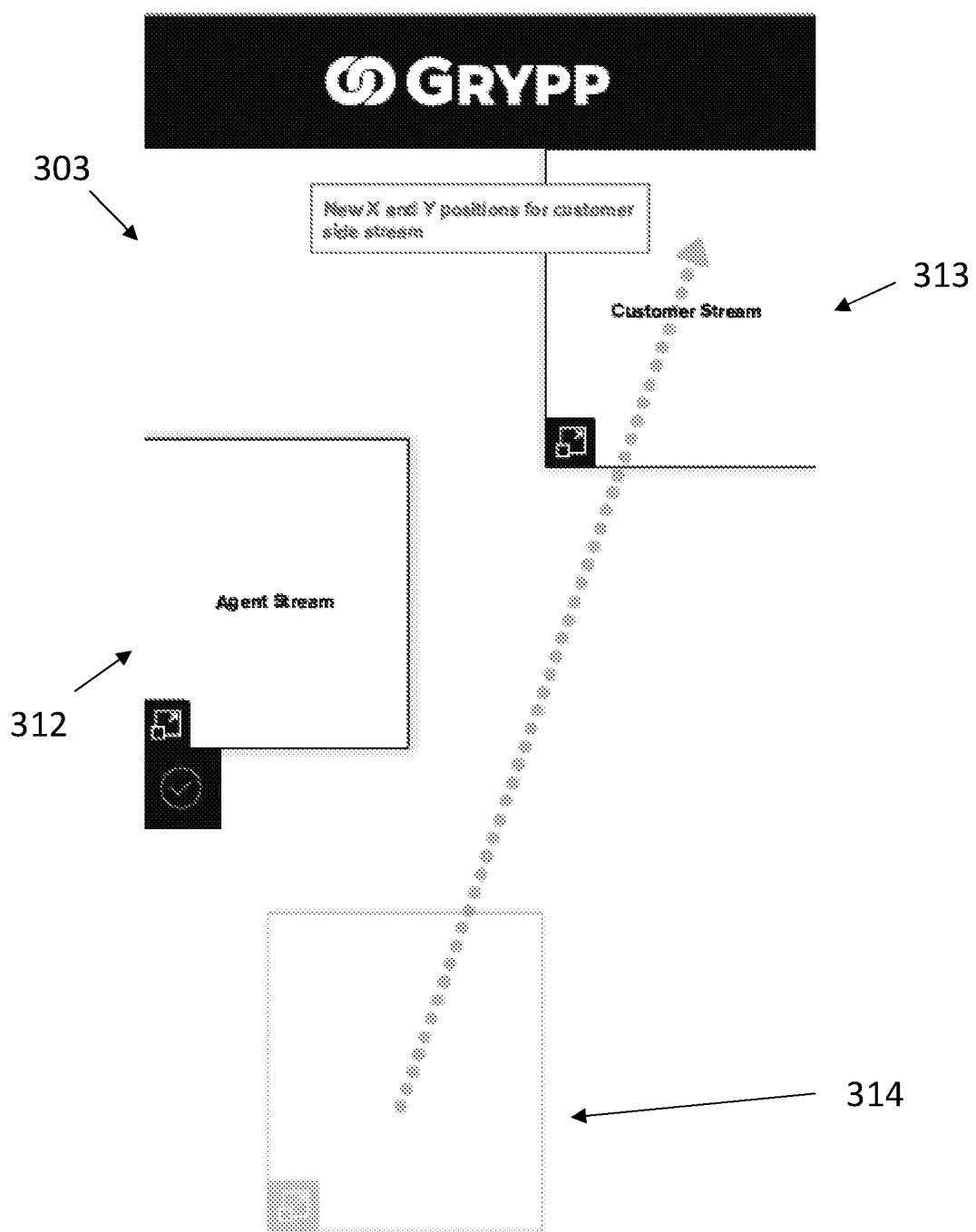
FIG. 8 shows an example screenshot of a content viewing area on a digital content renderer.

FIGS. 4 and 8 illustrates the content viewing area of the guest 303, following the host user interaction 320. In particular, the object 313 has been moved into a new position according to the manipulations of the user.

Figure 6:
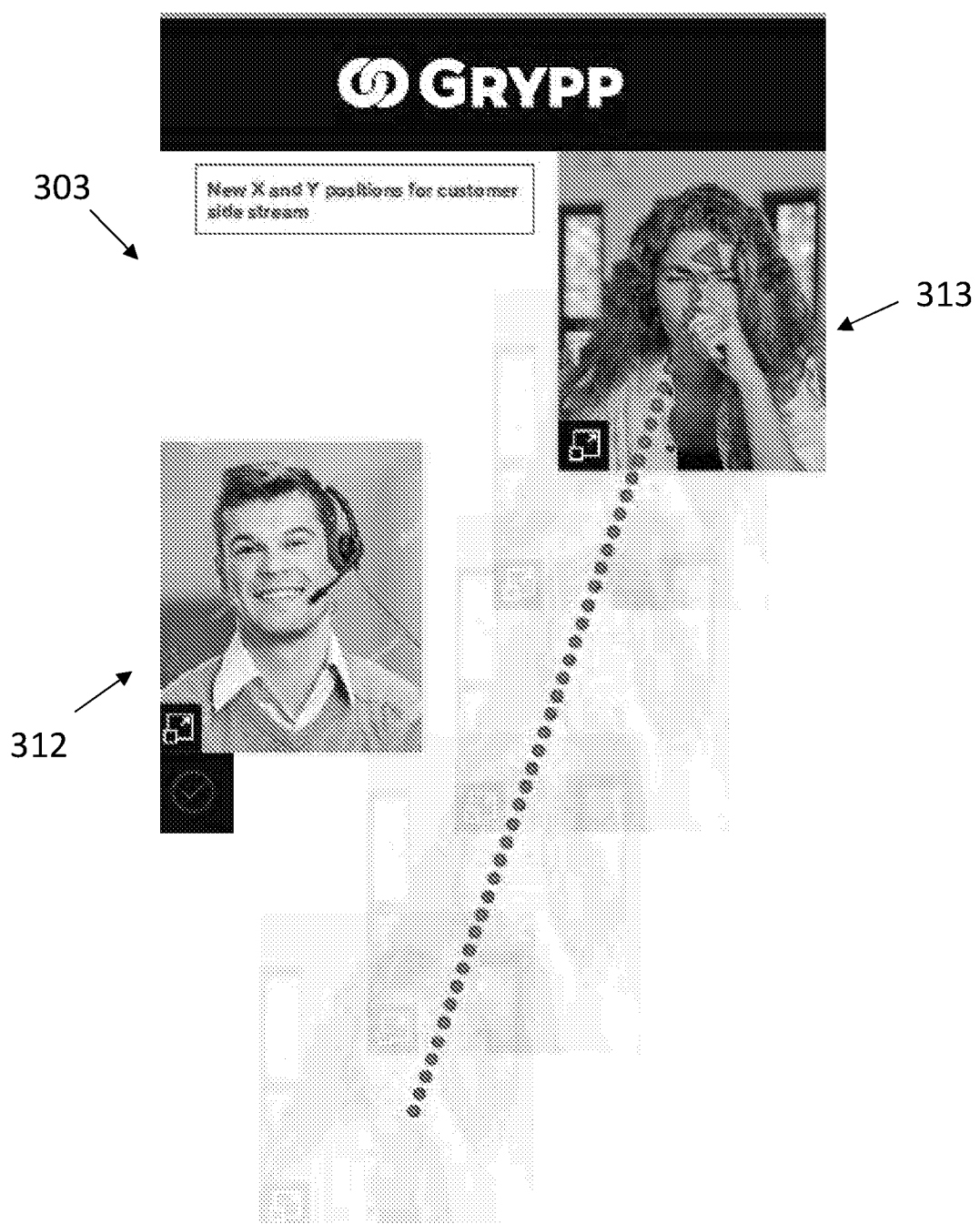
FIG. 6 shows an example screenshot of a content viewing area on a digital content renderer.

FIG. 6 shows another example of the guest content viewing area 303 that is similar to those discussed in respect of FIGS. 3 to 5. As the user interacts with an object, the modification to the object may be rendered at regular intervals or in real-time. For example, in the example shown in FIG. 6, the stream 313 moved by the host is rendered in updated positions on the guest content viewing area 303 as the host continues to move the video stream 313. That is, the host renderer 910 may send multiple delta messages, each indicating a change in the configuration of an object to the guest renderer 920. The guest renderer 920 may then modify the object to conform with the change in configuration for each successive message. As such, the object will appear to change in real-time on the guest renderer 920.

Each delta message (indicating each state of the object) may be stored as a JSON file in a database 930. The delta messages may then be accessed at a later time to review or play back a past conversation/presentation via the state data. This avoids the need for large amounts of storage space necessary for storing video data, as only the metric data needs to be stored, which requires comparatively smaller storage space. Furthermore, it is possible to skip to the correct place in the conversation/presentation more quickly, since the metric data inherently encodes the points of interest (e.g. when an object was changed). In contrast, a screen recording may include long periods where nothing of interest occurs on screen (which also unnecessarily increases the storage space required to store the screen recording).

It will be appreciated that, although FIGS. 3 to 8 illustrate the method in relation to moving a video stream, other embodiments are considered in which other interactions and other objects are used. For example, the interaction may include one or more of: changing a location, a size, a shape, a state and/or movement of one or more objects. The one or more objects may include one or more of: text, streaming media, a video, a document, a graphical control element and a JSON object (or object of another data exchange format). The graphical control element may be a window, a scrollbar, a button, a selection box, a slider or an input box. The graphical control element may also be a combination of such elements. Therefore, in one example, the host user may interact with a text box 331 by typing text into the text box 331. In a further example, the host user may interact with a selection box to select an option from a drop-down list. In yet a further example, the host may interact with a selection box to check a box 332.

Furthermore, the method described above in relation to FIGS. 1 to 8 may be two-way. In other words, the host renderer 910 may also act as a guest renderer 920 and a guest renderer 920 may also act as a host renderer 910.

For example, the guest renderer 920 may receive a message from the host renderer 910 indicating properties of the host content viewing area 301 and state data of one or more objects rendered in the content viewing area 301. This information may or may not include properties of the interactive representation 302 and state data of one or more objects rendered in the interactive representation 302.

The guest renderer 920 may then render an interactive representation of the second content viewing area 301. The guest user may then be able to interact with the one or more objects in the guest interactive representation, similarly to the method described in FIGS. 1-8 (e.g. steps 104-106), to cause a change in configuration in the second content viewing area 301.

Figure 9:
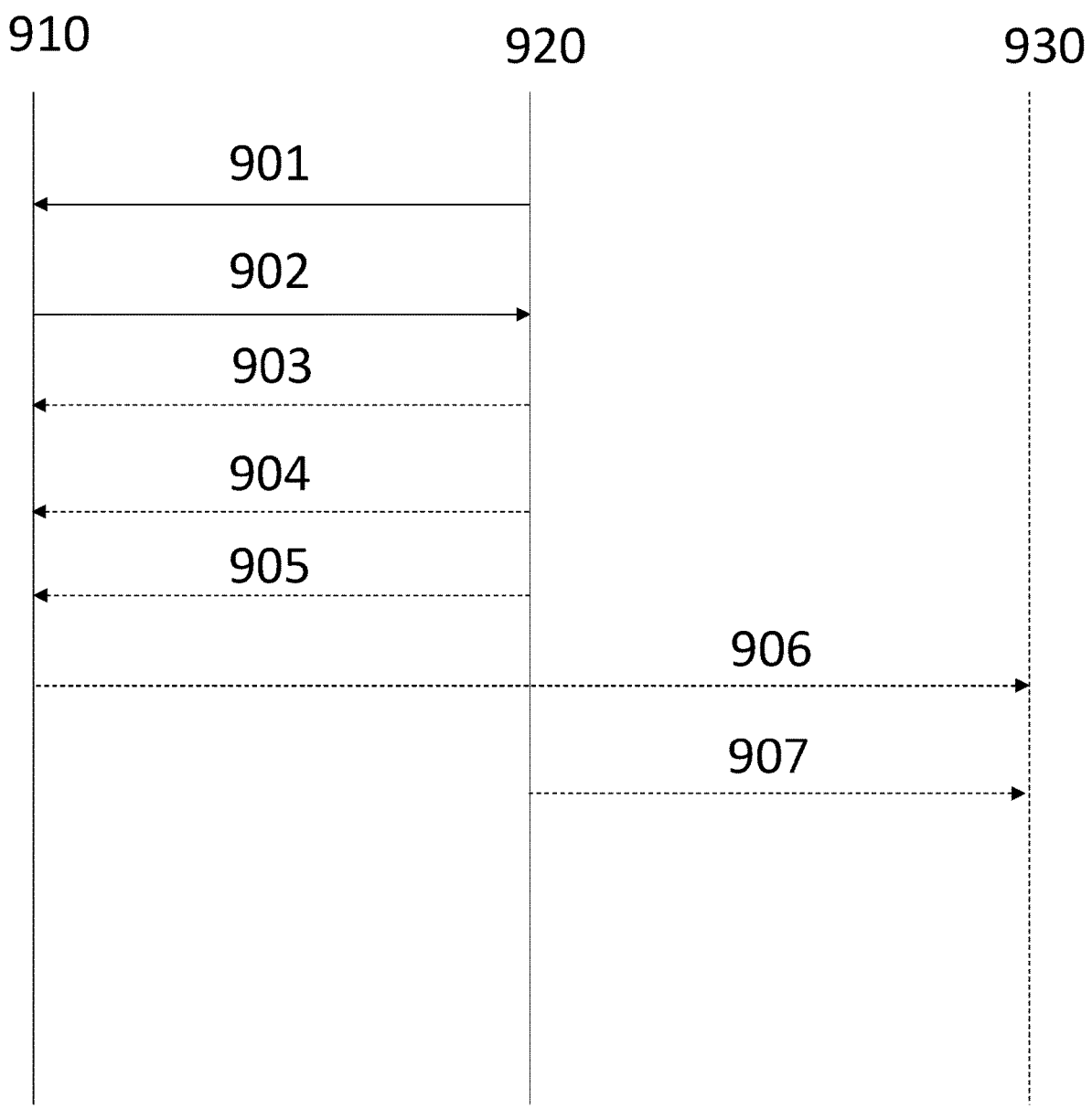
FIG. 9 illustrates a swim-lane diagram illustrating a sequence of steps for rendering content on a digital content renderer; and It should be noted that the figures are illustrated for simplicity and are not necessarily drawn to scale. Like features are provided with the same reference numerals.

FIG. 9 is a swim-lane diagram that illustrates an embodiment of the methods described herein.

At step 901, the first content renderer 910 receives a first communication from the second content renderer 920. The communication indicates properties of a first content viewing area on the first digital content renderer 920 and first state data of one or more objects rendered in the first content viewing area. The first state data includes a configuration of the one or more objects. Steps 103 to 105 describes with reference to FIG. 1 may then occur.

In step 901, a second communication is sent, by the second digital content renderer 910, to the first digital content renderer 920. The second communication may be a message as described in relation to steps 104 and 105 of FIG. 1. That is, the message may include second state data generated by the second digital content renderer 910 and may be a delta message. The message, when received by the first digital content renderer 920, causes the renderer 920 to modify the one or more objects rendered to conform with the change in configuration.

Optionally, in step 903, the first digital content renderer sends a third communication confirming that the one or more objects have been modified to conform with the change.

In step 904, the first digital content renderer may send a further (e.g. fourth) communication indicating properties of the first content viewing area. This message may be sent following a change in the content viewing area properties, which may result from a user rotating their computing device, such that the orientation of the content viewing area is changed, or changing the size of one or more windows rendered on the computing device, such that the size of the content viewing area changes. A change in orientation may also correspond to a change in size. The communication of step 904 may occur prior to step 902. If step 903 occurs, step 904 may also occur prior to this step.

The system may be two-way. For example, a user interaction with one or more objects may be received at the first digital content renderer 920. The first digital content renderer 920 may then generate third state data of the object, based on the change in the configuration. The first digital content renderer 920 may then send the third state data in a fifth communication to the second digital content renderer 910 in step 905. This step may occur before or instead of steps 903 and 904. The second digital content renderer 910 may then modify the object rendered in the interactive representation to conform with the change in configuration, based on the received third state data. Similarly to step 903, the second digital content renderer 910 may then send a message to the first digital content renderer 920 to confirm that the change has occurred in the interactive representation 302.

It may be determined that the fifth communication of step 905 is received at the second digital content renderer 910 within a predetermined time period of receiving the user interaction within the interactive representation 302. The predetermined time period may be 0.1 to 1 second. It will be appreciated that other time periods may also be used. It may be pre-set which user interaction takes precedence when the communication is received within the predetermined time period. For example, if changes by the host are set to take precedence, the second digital content renderer 910 may then prevent modification of the object rendered in the interactive representation 302, despite the received third state data. Otherwise, the second digital content renderer 910 may modify the object rendered in the interactive representation 302 in accordance with the received third state data.

In another embodiment, the step of preventing modification of the object may only occur when there is a conflict between the change in configuration of the object rendered in the interactive representation 302 and the change in configuration of the object rendered the first content viewing area 303.

In step 906, the second digital content renderer 910 may send properties of the second content viewing area, properties of the interactive representation and the second state data to a database 930. This information may be sent as a JSON file.

In step 907, the first digital content renderer 920 may send properties of the first content viewing area and the first state data to the database 930. This information may be sent as a JSON file. Accordingly, the database 930 may separately store data of each instantiation of the interactive session.

The system may include more than two digital content renderers. For example, there may be two or more host content renderers 910 and/or two or more guest content renderers 920. The method described above with relation to FIGS. 1-9 may therefore be applied to each of the additional digital content renderers. For instance, in the case where there are two host renderers 910, the guest renderer 920 may also send a communication to the second host renderer 911 indicating properties of the first content viewing area 303 and state data of objects rendered in the first content viewing area 303. In another example, a user interaction that changes a configuration of an object may be received on any of the digital content renderers. The relevant digital content renderer may then generate and send further state data that causes each of the other renderers to conform with the change in configuration.

As will be appreciated by the skilled person, details of the above embodiment may be varied without departing from the scope of the present invention, as defined by the appended claims.

For example, while digital content renderers or browsers have been described, other rendering or display tools be used to both capture presentation features or display or render the captured features. This may include mobile applications, client-server executables, or other programs.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A method for rendering digital content, the method comprising:

receiving, at a second digital content renderer, a first communication indicating properties of a first content viewing area of a first digital content renderer and first state data of an object rendered in the first content viewing area, the first state data including a configuration of the object;
rendering, by the second digital content renderer, a second content viewing area, wherein a portion of the second content viewing area contains an interactive representation of the first content viewing area including an indication of the object, wherein the interactive representation is rendered based on the received properties of the first content viewing area and the first state data;
rendering the object in the second content viewing area, outside of the portion of the content viewing area;
receiving, via the second digital content renderer, a user interaction within the interactive representation that changes the configuration of the object;
generating, by the second digital content renderer, second state data of the object based on the change in the configuration;
sending, from the second digital content renderer to the first digital content renderer, a second communication indicating the second state data that causes the first digital content renderer to modify the object rendered in the first content viewing area to conform with the change in configuration.

2. The method of claim 1, wherein the configuration and/or change in configuration of the object comprises one or more of: a location of the object, a size of the object, a shape of the object, a movement of the object and a state and/or property of the object.

3. The method of claim 1, wherein the object is one or more of: text, streaming media, a video, a document, a graphical control element and a JSON object.

4. The method of claim 3 when the object is a JSON object and the configuration and/or change in configuration of the JSON object is a property of the object, wherein the property indicates metric data of the JSON object.

5. The method of claim 4, wherein the second properties of the first content viewing area indicate a change in the size and/or orientation of the first content viewing area and the step of rendering the further interactive representation comprises modifying the interactive representation to conform to change indicated in the second properties.

6. The method of claim 1, further comprising:
following the receiving of the first communication, receiving, at the second digital content renderer, a third communication indicating second properties of the first content viewing area;
rendering, by the second digital content renderer, a further interactive representation of the first content viewing area, based on the received second properties.

7. The method of claim 1, wherein the communications are secure communications.

8. The method of claim 1, wherein the first content viewing area is a first viewport and the second content viewing area is a second viewport.

9. The method of claim 1, wherein the second state data comprises data indicating a difference between the initial configuration and the changed configuration.

10. The method of claim 1, further comprising:
receiving, at the second digital content renderer, a fourth communication from the first digital content renderer indicating that the object rendered in the first content viewing area has been modified to conform with the change in configuration.

11. The method of claim 1, further comprising steps of:
receiving, via the first digital content renderer, a user interaction within the first content viewing area that changes the configuration of the object;
generating, by the first digital content renderer, third state data of the object based on the change in the configuration;
receiving, at the second digital content renderer and from the first digital content renderer, a fifth communication indicating the third state data;
modifying, by the second digital content renderer, the object rendered in the interactive representation to conform with the change in configuration, based on the received third state data.

12. The method of claim 11, further comprising steps of:
determining that the receiving of the fifth communication is within a predetermined time period of the receiving of the user interaction within the interactive representation; and
according to a rules-based configuration that determines which user interactions take priority either:
preventing, by the second digital content renderer, modification of the object rendered in the interactive representation to conform with the change in the configuration indicated in the third state data; or
modifying, by the second digital content renderer, the object rendered in the interactive representation to conform with the change in configuration, based on the received third state data.

13. The method of claim 12, wherein the step of preventing modification of the object occurs only when there is a conflict between the change in configuration of the object rendered in the interactive representation and the change in configuration of the object rendered the first content viewing area.

14. A method for rendering digital content, the method comprising:
rendering, by a first digital content renderer, a first content viewing area and an object within the first content viewing area;
sending, by the first digital content renderer, a first communication indicating properties of the first content viewing area and first state data of the object rendered in the first content viewing area, the first state data including a configuration of the object;
receiving, at the first digital content renderer, a second communication indicating second state data, the second state data indicating a change in configuration of the object received at via an interactive representation of the first content viewing area rendered in a portion of a second content viewing area of a second digital content renderer, wherein the object is also rendered in the second content viewing area outside of the portion of the content viewing area;
modifying, by the first digital content renderer, the object rendered in the first content viewing area to conform with the change in configuration, based on the received second state data.

15. The method of claim 14, wherein the configuration of the object comprises one or more of: a location of the object, a size of the object, a shape of the object, a movement of the object and a state and/or property of the object.

16. The method of claim 14, further comprising a step of:
sending, by the first digital content renderer, a third communication indicating second properties of the first content viewing area, subsequent to the first communication.

17. The method of claim 14, further comprising steps of:
receiving, via the second digital content renderer, a further communication indicating third state data;
modifying, by the first digital content renderer, the object rendered in the first content viewing area to conform with the change in configuration, based on the received third state data.

18. The method of claim 17, further comprising steps of:
receiving, by the first digital content renderer, a user interaction within the first content viewing area;
determining that the sending of the further communication was within a predetermined time period of the receiving of the user interaction within the first content viewing area; and
according to a rules-based configuration that determines which user interactions take priority either:
preventing, by the first digital content renderer, modification of the object rendered in the first content viewing area to conform with the change in the configuration indicated in the third state data; or
modifying, by the first digital content renderer, the object rendered in the first content viewing area to conform with the change in configuration, based on the received third state data.

19. The method of claim 14, further comprising steps of:
sending, by second digital content renderer, properties of the second content viewing area, properties of the interactive representation and the second state data to the database; and
sending, by the first digital content renderer, properties of the first content viewing area and the first state data to the database.

20. A system for rendering digital content, the system comprising:
a first computing device comprising one or more processors and a memory storing computer-readable instructions which, when executed by the processor, cause the first computing device to perform:
receiving, at a second digital content renderer, a first communication indicating properties of a first content viewing area of a first digital content renderer and first state data of an object rendered in the first content viewing area, the first state data including a configuration of the object,
rendering, by the second digital content renderer, a second content viewing area, wherein a portion of the second content viewing area contains an interactive representation of the first content viewing area including an indication of the object, wherein the interactive representation is rendered based on the received properties of the first content viewing area and the first state data,
rendering the object in the second content viewing area, outside of the portion of the content viewing area,
receiving, via the second digital content renderer, a user interaction within the interactive representation that changes the configuration of the object,
generating, by the second digital content renderer, second state data of the object based on the change in the configuration, and
sending, from the second digital content renderer to the first digital content renderer, a second communication indicating the second state data that causes the first digital content renderer to modify the object rendered in the first content viewing area to conform with the change in configuration; and
a second computing device comprising one or more processors and a memory storing computer-readable instructions which, when executed by the processor, cause the second computing device to perform:
rendering, by a first digital content renderer, a first content viewing area and an object within the first content viewing area,
sending, by the first digital content renderer, a first communication indicating properties of the first content viewing area and first state data of the object rendered in the first content viewing area, the first state data including a configuration of the object,
receiving, at the first digital content renderer, a second communication indicating second state data, the second state data indicating a change in configuration of the object received at via an interactive representation of the first content viewing area rendered in a portion of a second content viewing area of a second digital content renderer, wherein the object is also rendered in the second content viewing area outside of the portion of the content viewing area, and
modifying, by the first digital content renderer, the object rendered in the first content viewing area to conform with the change in configuration, based on the received second state data.

* * * * *